United States Patent Office 3,360,595
Patented Dec. 26, 1967

3,360,595
PROCESS FOR PRODUCING FUSED
CERAMIC BLOCKS
William Wittels, 2 Cheyne Walk, Chelsea,
London S.W. 3, England
No Drawing. Filed June 14, 1965, Ser. No. 464,271
Claims priority, application Great Britain, June 16, 1964,
24,987/64
5 Claims. (Cl. 264—63)

ABSTRACT OF THE DISCLOSURE

A process for the production of fused granite shapes comprising forming pulverized granite particles into "green" shapes which are at least 93% of the density of the solid natural granite from which said pulverized granite particles are obtained and firing such "green" shapes at a temperature in the range of 1150°–1300° C. for a sufficient time to cause surface fusion of the lower melting point constituents of the granite particles throughout the mass so as to cause coherence of the particles.

---

The present invention relates to the production of building blocks and in particular it relates to building blocks and tiles which simulate slabs quarried from natural granite.

Large quantities of pulverized granite waste is available wherever granite has been quarried and this waste is found in practice to include particles of a considerable range of sizes.

If these particles can be caused to coalesce into a mass as they are in natural granite rocks, fused or sintered granite blocks, both plain and patterned, can be produced for architectural, decorative and artistic applications. The present invention is based on the idea of causing the coalescence of granite particles by raising the temperature of a mass of such particles to a point where the lower melting point components of the granite fuse and bind the particles together. As is well known naturally occurring granite is composed of a mass of a number of different minerals, which have different melting points.

I have found that fused granite shapes of satisfactory strength and having substantially the appearance of natural granite can be produced by firing "green" pulverised granite shapes under controlled temperature conditions providing that care is taken to reduce the voids space within the mass of granite particles in the "green" shapes.

By pulverized granite shapes or pulverized granite particles is meant the particles of granite left over when blocks or other shapes are quarried and/or cut from larger masses of granite. When such pulverized granite are obtained from a quarry they are referred to hereinafter as granite waste or granite quarry waste.

It is known that the void spaces within a mass of solid particles can be reduced to a low value by careful grading of the particles, but I have found that using pulverized granite quarry waste, it may not be necessary to effect any special grading of the particles, because the size distribution of the particles in the quarry waste may be sufficiently close to an ideal distribution for practical purposes. It is, however, necessary to compact the mass of particles into the form of coherent handleable "green" shapes. The grading of particles used in the "green" shapes should be constant to ensure uniform production.

According to the present invention a process for the production of fused granite shapes comprises forming granite particles into "green" shapes which are close to the density of a solid natural granite block from which the particles are obtained and firing such "green" shapes at a temperature in the range of 1150°–1300° C. for a sufficient time to cause fusion of the lower melting point constituents of the granite particles throughout the mass so as to cause sintering of the particles. The firing temperature must not be to an excessively high temperature nor must it be too long continued, since this would result in excessive melting of particles at the surface of the shape and an excessively glazed appearance as a result. The firing temperature can be controlled to give a variety of surface appearances. The optimum firing time depends on the thickness of the shape. Where blocks of ½" thickness were being produced, a satisfactory firing time was found to be 3½–4 hours, whereas with 1" thickness 5½–6 hours was required when an optimum firing temperature in the range of 1200–1230° C. was employed. By increasing the firing temperature, the firing time can be reduced and at temperatures below 1200° C. longer firing time than those quoted above are required.

In order to obtain the necessary compaction of the granite particles in the "green" shape either a high pressure of ramming must be applied to the material in a mould.

In practice it is necessary to be able to handle the "green" shapes to enable them to be transferred to the firing kiln and to achieve the necessary green strength the granite particles are preferably mixed with a binder before compressing into a "green" shape in a mould. After drying, the "green" shape can be handled without undue damage if reasonable care has been exercised.

A suitable binder for the present purpose should, in addition to give good "green" strength, also assist in releasing the "green" compress from the mould. It should also not lead to any detrimental effect on the mechanical properties or visual appearance of the material after firing; it should not actively affect the firing conditions, for example, by raising the firing temperature; it should for these reasons be effective in small quantities and it should moreover be cheap.

It is found that a bentonite clay is a satisfactory binder. The binder clay in the dry state should be such that it can pass through a 150 mesh British Standard sieve and is preferably finer.

When the granite particles and the binder are mixed, it is found desirable to add a small amount of water, say about 5–20% by volume of the mix, to render the clay adhesive. After the mix has been compacted sufficiently it is dried out slowly to increase the "green" strength of the mass, which then has approximately the strength of "green'" concrete. The amount of binder used is about ½–5% of the weight of the granite particles in the mix. For example the inclusion of 2½ bentonite gave very good results.

The surface appearance of granite shapes made by the process of the invention can be varied by varying the maximum particle size present in the mix. For example products of different surface appearance are produced if the mix contains all the particles, present in average granite quarry waste, which will pass a 6 mesh British Standard sieve, on the one hand, and a 16 mesh British Standard sieve, on the other hand, although in both cases products of satisfactory mechanical strength can be produced.

A typical granite quarry pulverised waste obtained from a quarry in Cornwall, England, had the following particle size distribtuion.

| Mesh size (British Standard): | Percent by weight |
|---|---|
| +6 | 11.9 |
| −6+8 | 11.5 |
| −8+12 | 14.2 |
| −12+16 | 19.9 |
| −16+22 | 9.9 |
| −22+30 | 8.95 |
| −30+44 | 6.9 |
| −44+60 | 6.1 |
| −60+85 | 6.6 |
| −85+120 | 3.2 |
| −120 | 9.9 |

As is conventional (−) indicates that the particle passes that mesh size, whilst (+) indicates that the particles are retained on the mesh size indicated.

It will be seen that the variation in particle size is reasonably uniform over the whole size range as is required to permit satisfactory compaction of the particles into a dense mass. With this fairly uniform distribution of particle size a dense "green" shape can be obtained both when using the whole of the particles passing a 6 mesh sieve and when using only the particles passing though a 16 mesh sieve.

The process of the present invention particularly lends itself to the production of sintered granite tiles or facing blocks, intended for facing a building. Such tiles or blocks can be made by the process of the present invention from very inexpensive raw material in the form of pulverised waste from granite quarries.

In a typical example pulverised granite waste having approximately the particle size distribution set forth above and obtained from a Cornish granite quarry was sieved and the particles below 16 mesh size were mixed with 2½ bentonite by weight and this mix then had about 5–10% water added by volume and was further mixed until it was substantially homogeneous. The wet mix was then rammed in a mould until the density of the mix was above 93% that of natural granite rock taken from the quarry and the "green" shape was a tile of about ½″ thickness. This was then dried for about two hours below 100° C. to improve its "green" strength. The "green" tile was then transferred to a firing furnace. Here the temperature was gradually increased over 2 hours to a firing temperature of 1220° C. at which its was held for five hours. Thereafter the fired shape was allowed to cool slowly in the furnace over 2–4 hours to avoid thermal shocks, which could lead to cracking. During the firing the density of the product increased to about 98% of that of naturally occurring granite and there was therefore slight shrinkage from the "green"' shape. The fired product was a tile closely resembling natural granite and was free from observable cracks.

In general, it has been found that the quantity of water added should be rather greater when the coarser particles have been eliminated from the pulverized granite than when all the particles passing 6 mesh are present. The amount of water present should be sufficient to permit the binder to cause the particles to adhere together without at the same time causing the particles to adhere to the mould. A suitable water addition rate can be determined by simple experiment for each pulverized granite/binder mixture.

Granite blocks or tiles made in accordance with the present invention make an excellent base to receive brilliantly coloured enamels which are developed by further firing at 850–1000° C. and are also included in this invention.

In a further series of examples artificial granite shapes were prepared as shown in the following table:

| Size in inches | Particles [1] | Binder | Water, cc. | Fired | Comments |
|---|---|---|---|---|---|
| 9 x 4 x 1 | 6# | Bentonite 2½% | 150 | | Excessive water. Not fired. Could not handle. |
| 9 x 4 x 1 | 16# | do | 100 | 5 hrs. at 1,220° C | Satisfactory. |
| 4½ x 4 x ½ | 6# | do | 20 | 4 hrs. at 1,220° C | Do. |
| 4½ x 4 x ½ | 30# | do | 20 | 4 hrs. at 1,220° C | Do. |
| 3″ dia. dish shape | 12# | do | ([2]) | 4 hrs. at 1,220° C | Do. |
| 4½ x 4 x ½ | 12# faced with −6#+8# | do | 20 | 4 hrs. at 1,220° C | Insufficient firing penetration. |
| 9 x 4 x 2½ | 8# | do | 250 | 15½ hrs. at 1,140° C | Satisfactory. |
| 9 x 4 x 1 | As received | do | 80 | 5 hrs. at 1,220° C | Satisfactory. |
| 9 x 4 x 1 | 16# | None | 80 | 5 hrs. at 1,220° C | Cracked in furnace. |
| 9 x 4 x 1 | 16# | Bentonite 2½% except for top ⅛th. | 80 | 5 hrs. at 1,220° C | Satisfactory. |

[1] The mesh number given under "Particles" refers to the sieve through which the as-received granite powder was passed in order to give the mix material.
[2] Not measured.

In tests carried out on typical blocks prepared under the conditions described it was found that the structural properties were considerably superior to those of normally prepared mass concrete, owing to the freedom of void spaces in the product.

Thus the 24 hour water absorption rate of my artificial granite blocks is about ½–1%, as compared with a representative rate of 5–10% for concrete.

The drying shrinkage of the material, as determined by standard tests, is about 0.001% as compared with about 0.02% for a typical concrete.

Compressive strength of test pieces of the material has been determined as lying in the range of 11,500–17,500 lbs./sq. inch as compared with 3000–8000 lbs./sq. inch for typical concretes.

Modulus of rupture of the test pieces was found to be in the range of 750–1100 lbs./sq. inch as compared with 500–800 lbs./sq. inch for typical concrete.

The granite particles used in the above tests had the following composition, determined on an oxide basis:

| | |
|---|---|
| Silica | 72.84 |
| Alumina | 16.25 |
| Ferric oxide | .14 |
| Lime | 1.10 |
| Ferrous oxide | 1.49 |
| Magnesia | .55 |
| Sodium oxide | 2.25 |
| Potassium oxide | 5.19 |
| Moisture and loss | .63 |

I claim:

1. A process for the production of fused granite shapes comprising forming pulverized granite particles into "green" shapes which are at least 93% of the density of the solid natural granite from which said pulverized granite particles are obtained and firing such "green" shapes at a temperature in the range of 1150°–1300° C. for a sufficient time to cause surface fusion of the lower melting point constituents of the granite particles throughout the mass so as to cause coherence of the particles.

2. A process according to claim 1, in which the firing temperature is in the range of 1200–1230° C.

3. A process according to claim 1 further comprising up to 5% of a bentonite clay binder in the granite particles.

4. A process according to claim 1 in which the pulverized granite particles comprise granite quarry waste, from which particles coarser than 6 British Standard Mesh have been sieved out.

5. A process according to claim 1 in which the pulverized granite particles comprise granite quarry waste, from which particles coarser than 16 British Standard Mesh have been sieved out.

References Cited

UNITED STATES PATENTS 3,199,992    8/1965    Moffitt _____ 264—44 X

ROBERT F. WHITE, *Primary Examiner.*

J. A. FINLAYSON, *Assistant Examiner.*